(No Model.)

J. C. BARLOW.
COVERING SHOVEL FOR PLANTERS.

No. 387,483. Patented Aug. 7, 1888.

Witnesses.
Chas. R. Burr.
Thomas Durant.

Inventor.
Joseph C. Barlow,
by Clinch & Clinch
his Attorneys.

UNITED STATES PATENT OFFICE.

JOSEPH C. BARLOW, OF QUINCY, ILLINOIS.

COVERING-SHOVEL FOR PLANTERS.

SPECIFICATION forming part of Letters Patent No. 387,483, dated August 7, 1888.

Application filed April 10, 1888. Serial No. 270,168. (No model.)

*To all whom it may concern:*

Be it known that I, JOSEPH C. BARLOW, of Quincy, in the county of Adams and State of Illinois, have invented certain new and useful Improvements in Cover-Shovels for Planters; and I do hereby declare the following to be a full, clear, and exact description of the same, reference being had to the accompanying drawings, forming a part of this specification, and to the figures and letters of reference marked thereon.

My present invention relates to devices for operating the covering devices for planters, particularly that class adapted for use on corn-planters; and it consists in certain improvements in the devices for supporting and adjusting the covering-shovels, all as hereinafter fully described, and pointed out in the claims at the end of this specification.

Figure 1:
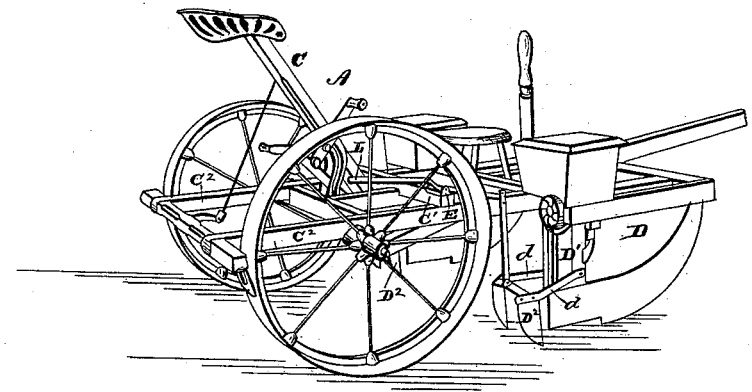
Figure 2:
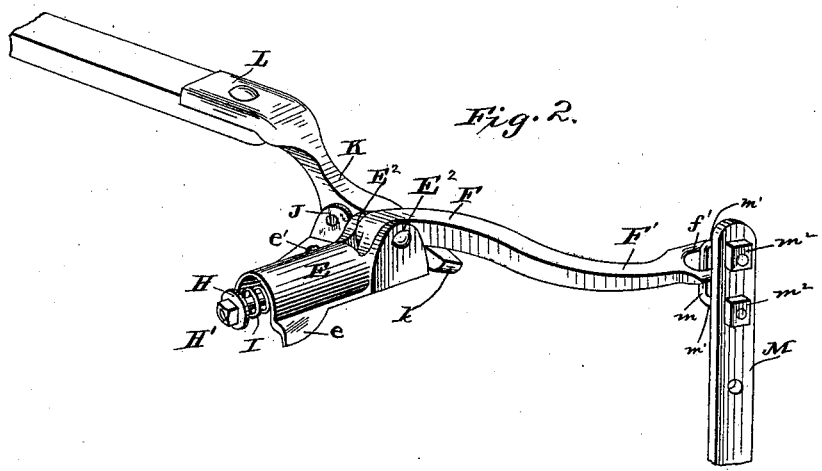
Figure 3:
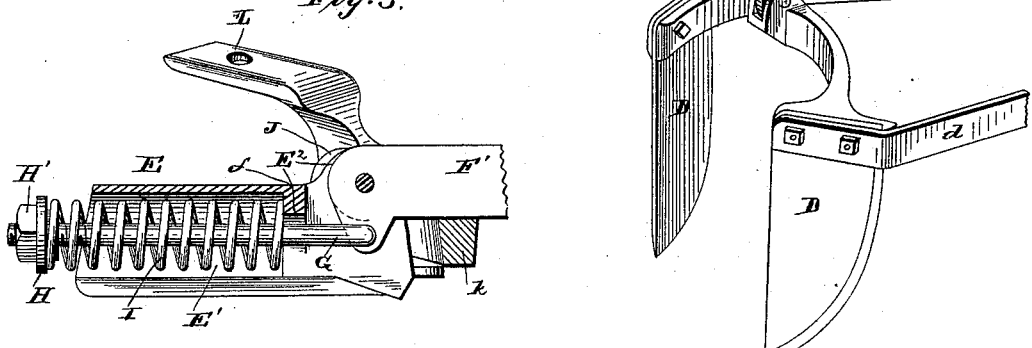

In the accompanying drawings, Figure 1 is a perspective view showing the application of my invention to a corn-planter of a well-known type. Fig. 2 is a detail perspective view of the device detached. Fig. 3 is a sectional view through the shovel-supporting lever.

Similar letters of reference in the several figures indicate the same parts.

While my shovel-operating device is particularly constructed and adapted for use in connection with a planter consisting, essentially, of a runner-frame jointed to the main frame supported upon suitable wheels, it is not confined to such construction, but is capable of application to various other forms of machines, though I shall describe herein but one form of its embodiment, and that in connection with the machine mentioned.

The letter A in the drawings represents the main frame carried by the wheels of the machine, having the seat-support standard C, and constructed of suitable timbers, the exact location of which is immaterial, save that in the present instance the cross-timber C' projects on either side a short distance above the horizontal timbers C².

D represents the runner-frame, and D' the runner-standard, to the lower portion of which the coverer-shovels D² are pivoted, suitable links, *d d*, forming the connection, as ordinarily. The shovels may be of the ordinary or any preferred construction; but in the present instance I prefer to construct them of the blades set in the frame at an angle with each other and rounded at the front or side toward the runner, the object of which is to render them in a measure self-clearing and to prevent the accumulation of weeds or trash.

On the ends of the timbers C', before mentioned, I prefer to locate the shovel-supporting device, and accordingly I construct the latter with a base or supporting casting, E, having depending retaining-flanges *e e*, adapted to project on opposite sides of said timber, and with a perforation, *e'*, for the accommodation of a bolt passing through it and through said timber. Any other fastening device may be employed that will answer the purpose, and the flanges be dispensed with. Still I prefer to employ them.

The casting E is recessed at E' on its under side, said recess extending the length of the base, and on its upper side, at the outer portion, are two lugs or ears, E² E², perforated, and with a pivotal bolt extending through them, on which is pivoted a bell-crank lever, F. The lower or short arm of this lever is provided with a transverse perforation, in which is placed the hooked end of a draft-rod, G, located in the recess E, and having at its outer end a washer, H, and nut H', the latter adapted to be adjusted on the threaded portion, as shown, while between this washer and suitable lugs, *f f*, forming a contracted portion of said recess, is a spring, I, encircling the rod and tending to pull on the rod and draw down the outer extensions, F', of the lever.

J J represent lugs or ears on the base casting, and preferably extending at an angle with the lugs E² E², said lugs being perforated and having pivoted between them a lever, K, the forwardly-projecting end of which is bent down and to one side, and passes beneath the extension F' of lever F, the shoulder formed where it is bent resting upon the base, as shown, while its rear end extends upward and is formed to receive the end of a short foot-lever, L, secured to it in any suitable manner.

The extension F' of lever F is provided with an eye, *f'*, at its outer end, with which the cover-shovel is adapted to be connected, preferably by means of the connection shown— that is, the supporting-link M, attached to the shovel-frame by a pivot, as usual, has near its upper end a loop bolt or eye, $m$, passing through the eye $f'$ on lever F, and provided with two legs, $m'$ $m'$, arranged to enter perforations in link M, a number of which are provided, and to be secured therein by nuts $m^2$ $m^2$, applied to the outer ends of the legs and clamping the link between them, and washers or collars secured thereon, as shown.

When in normal position, the shoulder of lever K rests upon the casting, with its extension $k$ under the lever F', which latter, being all the time drawn down by its spring I, rests upon it, and it in effect constitutes a stop to limit its movement, though any other form of stop may be employed and the lever simply remain in contact with it, or nearly so. The short arm $k$ of the lever K, it will be noted, is, by the arrangement shown, enabled to come very close to the pivotal point of the bell-crank, and the extension L being much longer, a slight motion of the latter will serve to move the outer end of lever F' through a long arc, and thus raise the latter and the shovel without a great expenditure of power. As stated, the loop on the link M is connected to the lever F, and the shovel is so adjusted relative to the furrow-opener and this lever that when the device is in operation the shovel will perform its function of covering in the best manner, the lever end pressing slightly on the lower arm of loop $m$, holding the shovel in contact with the ground by spring-pressure, so that should an obstruction be met with the shovel would move upward against the tension of the spring, and when passed the latter would return it to normal position, and the arrangement of the loop and spring will allow of a very nice adjustment of the parts in this direction to produce the best results.

The arm F' being limited in its downward movements by the lever K, constituting the stop, is prevented from pressing the shovel too far down should a dead furrow be crossed; but, the connection with said lever being loose in an upward direction, the shovel is permitted to drop slightly, and on emerging is again acted upon by the spring, as before.

Should the driver wish to raise the shovel for any purpose, it is only necessary for him to press with his foot upon lever L, causing the toe of said lever to tilt lever F, raising its extension F', and with it the shovel. Upon the removal of his foot the spring will immediately force the shovel back to normal position and hold it to its work, as before.

It will of course be understood that while I have described and shown the application of but one of my improved attachments, ordinarily there are two of them, one for each runner, and when applied to this class of machines both are preferably attached to the opposite ends of the timber of the frame, as described, in the same manner, the necessary modifications being made in the castings to provide for the angling of the levers in the proper direction relative to the position of the driver, and both being within his convenient reach.

The herein-described attachment is convenient in arrangement, and, being constructed with all the parts arranged upon a single base casting, can be made as a separate part and attached to planters now in use.

It may be stated that while in the arrangement shown, the recess in which the spring is located is at an angle to the plane of the casting, it is only for the purpose of more convenient arrangement of the parts in the form of planter shown, and is not essential.

Various modifications can be devised without departing from the spirit of my invention, and I do not therefore desire to be confined to the exact construction of device herein shown, except as specified in the claims.

Having thus described my invention, what I claim as new is—

1. The combination, with a planter and a cover-shovel, of a spring interposed in the connection between them, and a lever operating to raise the shovel against the tension of the spring, substantially as described.

2. In a planter, the combination, with a cover-shovel, of a spring operating to force the shovel toward the ground, and a lever operating as a stop to limit the motion of the shovel and arranged to be operated to raise the shovel against the spring, substantially as described.

3. In a planter, the combination, with the cover-shovel, of a supporting-link for the latter, a lever to which the link is connected, a spring operating upon said lever, a lever for acting upon the lever connected to the link and arranged to be operated to cause the lifting of the shovel against the spring, substantially as described.

4. In a planter, the combination, with the shovel, of a supporting-link for the same, a lever connected to the link, and a spring operating to depress the shovel, a stop to limit the downward movement, and a lever projecting beneath the lever connected to the link and arranged to be operated to cause the raising of the shovel against the spring, whereby the shovel can be raised independently of the last-mentioned lever or by means of it, substantially as described.

5. In a planter, the combination, with the cover-shovel, of a supporting-link, a lever, a spring operating upon the same, means for adjusting the tension of the spring, a stop, and a slotted loose connection between said link and lever, substantially as described.

6. In a planter, the combination, with the cover-shovel and a link connected therewith having an elongated eye thereon, of a lever for adjusting the link engaging said eye, substantially as described.

7. In a planter, the combination, with the cover-shovel, of a link connected thereto, a lever, a spring operating upon said lever, a stop for the lever, and a slotted loose connection between said lever and link, substantially as described.

8. In a planter, the combination, with the cover-shovel, and a link connected therewith having the adjustable elongated staple or eye secured thereto, of a lever for operating upon the link engaging said eye, substantially as described.

9. In a planter, the combination, with the cover-shovel, of a supporting-link connected to the same, the pivoted bell-crank lever, one arm engaging the link and the other operated upon by the spring, said spring, and a stop for limiting the movement of the lever, arranged to hold the shovel with a yielding pressure, substantially as described.

10. In a planter, the combination, with the cover-shovel, of a link connected to the same, the pivoted bell-crank lever, one arm engaging the link and the other operated upon by the spring, said spring, and a pivoted lever engaging said bell-crank lever to raise the shovel, substantially as described.

11. In a planter, the combination, with the cover-shovel, of a link connected thereto, the base-casting, the bell-crank lever pivoted thereon, one arm connected with the shovel-link and the other with a draft-link having a projection thereon, a spring between the projection and the casting, and a lever arranged to operate upon the bell-crank to raise the shovel against the spring, substantially as described.

12. The improved attachment for planters for adjusting the cover-shovels, consisting of a base-casting having mounted upon it a spring-operated lever adapted to be connected to the shovel, and a lever independent of the first-mentioned one arranged to engage the same and operate it, substantially as described.

JOSEPH C. BARLOW.

Witnesses:
CHARLES E. COX,
L. B. BOSWELL.